United States Patent [19]

Zatsky

[11] 4,262,062
[45] Apr. 14, 1981

[54] METAL-AIR BATTERY WITH ENVIRONMENT CONTROL FOR INTERMITTENT HIGH CURRENT DEMAND

[75] Inventor: Norman Zatsky, Southbury, Conn.

[73] Assignee: Timex Corporation, Waterbury, Conn.

[21] Appl. No.: 133,212

[22] Filed: Mar. 24, 1980

Related U.S. Application Data

[63] Continuation-in-part of Ser. No. 66,203, Aug. 13, 1979, abandoned.

[51] Int. Cl.³ .......................................... H01M 12/06
[52] U.S. Cl. ...................................... 429/27; 429/72; 429/110
[58] Field of Search ............... 429/27, 72; 58/23, BA; 429/110

[56] References Cited

U.S. PATENT DOCUMENTS 2,468,430  4/1949  Derksen ................................. 429/27
3,746,580  7/1973  Aker et al. ............................. 429/27

FOREIGN PATENT DOCUMENTS 2224882  10/1974  France ....................................... 429/27

*Primary Examiner*—Donald L. Walton
*Attorney, Agent, or Firm*—William C. Crutcher

[57] ABSTRACT

An air/metal cell includes an internal gas-permeable membrane to restrict the transfer of oxygen from ambient atmosphere to the cathode, and incorporates an internal valve actuated by external force on the cell to open the valve and admit substantial quantities of oxygen for intermittent high current drain on the cell. Preferably the external force is provided by the same switching device which closes the electric circuit requiring the high current drain. The cell is specifically shown in the environment of a zinc/air cell powering a digital wristwatch. The high current mode of the cell is actuated by the pushbutton of the watch which turns on a miniature lamp.

10 Claims, 5 Drawing Figures

METAL-AIR BATTERY WITH ENVIRONMENT CONTROL FOR INTERMITTENT HIGH CURRENT DEMAND

BACKGROUND OF THE INVENTION

This is a continuation-in-part of Ser. No. 066,203, filed Aug. 13, 1979 now abandoned.

This invention relates generally to air/metal cells designed for low current operation but which intermittently are required to furnish high current. More particularly, the invention relates to an improved zinc/air battery useful for a wristwatch connected to the watch circuit for normal operation and which also intermittently supplies accessory devices, within the watch, such as an incandescent lamp requiring a higher current drain.

Air/metal cells are well known in the art, these generally comprising a consumable metal anode, a catalytic nonconsumable, oxygen-consuming cathode, and a suitable electrolyte. The principles of operation of such cells are described in U.S. Pat. No. 3,419,900 issued Dec. 31, 1968 to Elmore et al and in U.S. Pat. No. 3,553,024 issued Jan. 5, 1971 to Fishman. Although the foregoing patents are illustrated in the context of fuel cells or multicell batteries with replaceable anodes, air/metal cells have been more conveniently and recently manufactured in the form of miniature button cells for hearing aids and the like. The typical zinc/air button cell generally includes the following components:

1. A cathode can which includes at least one aperture for entrance of air and which contains a nonconsumable air cathode structure usually comprising a gas permeable hydrophobic polymer film onto which is pressed a metal current collection grid and a waterproof, porous catalyst material such as metal catalyzed activated carbon admixed with a hydrophobic binder. Although actually an independent component of the cell, one or more electrolyte-absorbing separator layers are placed on the catalyst layer of the cathode structure to separate it from the anode.

2. An anode can which is joined to the cathode can typically by crimping and which includes a zinc anode mass typically in the form of amalgamated zinc powder (e.g. containing 3–8 w % Hg) or of a porous zinc compact, saturated with an alkaline electrolyte such as a 30–40% aqueous solution of KOH.

3. A polyethylene, polypropylene, nylon, etc. insulator between the cathode and anode can which insulator also functions in many cases as an electrolyte seal.

Control of the admission of air to the air-consuming electrode was provided by small holes in the button cell container as illustrated in U.S. Pat. No. 3,897,265 issued July 29, 1975 to Jaggard. Such cells are suitable for relatively high current drains such as 10 milliamperes which are used in hearing aids. Subsequently, zinc/air cells have been developed for long life, low current drain, as required in electric wristwatches by adding a special membrane to control the admission of oxygen to the air-consuming catalyst. One such type is known in U.S. Pat. No. 4,105,830 issued Aug. 8, 1978 to Kordesch which is permeable to oxygen. Another approach is shown in U.S. Pat. 4,118,544 issued Oct. 3, 1978 to Przybyla et al using very tiny pores or passages through a barrier to the cathode.

In all of the foregoing constructions, the means for controlling the admission of oxygen to the cathode is tailored for a specific application or range of current drain expected to be encountered by the cell. The foregoing constructions do not lend themselves to dual operation of the cell in either a low current or a high current mode.

In a battery-operated wristwatch, either the digital type or the analog type (having hands driven through a motor), the watch is designed to draw very low current from the battery, so as to last for periods of a year or more. Such watches also typically draw high currents on an intermittent basis to operate a miniature incandescent lamp, alarm or similar device. It would be desirable to have a zinc/air battery to fulfill the functions of low and intermittent high current drain.

Accordingly, one object of the present invention is to provide an improved air/metal cell for dual operation either in high current or low current mode.

Another object of the invention is to provide an improved zinc/air cell suitable for a battery-operated wristwatch.

Another object of the invention is to provide an improved watch construction for utilizing such an improved air/metal cell.

SUMMARY OF THE INVENTION:

Briefly stated, the invention is practiced by providing an air/metal cell, including a barrier restricting flow of oxygen to the cathode, and having selectively actuated valve means for bypassing the barrier and admitting a greater flow of oxygen to the cathode. In the preferred embodiment, the valve means is actuated by electric switching means closing a circuit requiring greater current drain on the cell.

DRAWING:

The subject matter, which is regarded as the invention is particularly pointed out and distinctly claimed in the concluding portion of this specification. The invention, however, both as to organization and the method of practice, together with further objects and advantages thereof, may best be understood by reference to the following description, taken in connection with the accompanying drawing, in which:

DESCRIPTION OF THE PREFERRED EMBODIMENT

Figure 1A:
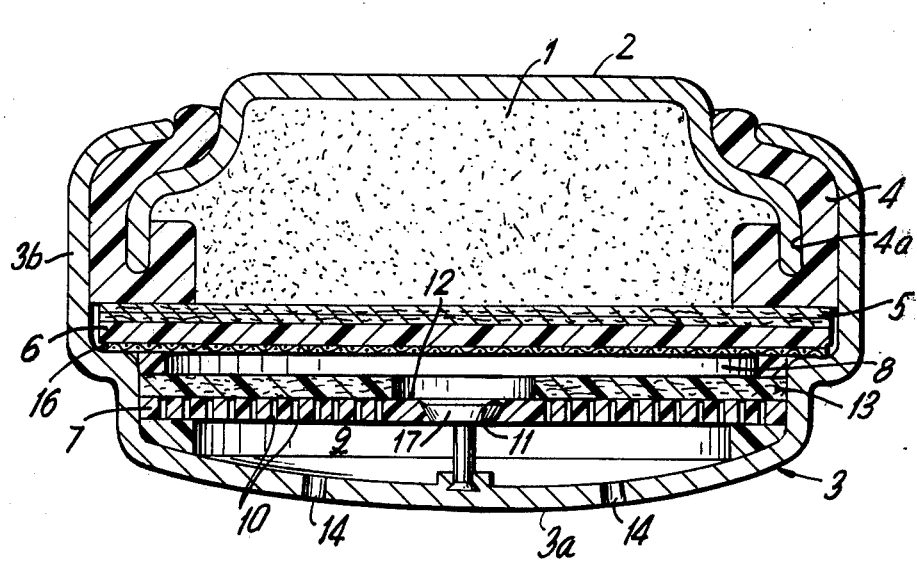
FIG. 1a is a simplified, cross-sectional, elevation view of a zinc/air button cell embodying the invention, showing the valve closed.

Referring to FIG. 1a of the drawing, a zinc-air button cell is shown in cross section. Conventional elements include an anode of compacted zinc or amalgamated zinc powder 1 in an anode cup 2, a complementary lower cathode cup 3 having, a circular bottom 3a and cylindrical sidewalls 3b which are crimped around anode cup 2 and sealed with an insulating grommet spacer 4. The grommet also includes an annular slot 4a receiving the depending walls of the anode cup 2. A multilayer separator 5 may be a fibrous cellulose material which contains aqueous KOH. The cathode 6 may comprise a layer of activated carbon catalyst coated or mixed with a hydrophobic polymer such as polytetrafluoroethylene. The cathode 6 is supported on and makes electrical contact with a metallic wire mesh 16 which also makes electrical contact with the cathode cup 3. The foregoing materials and constructions are merely illustrative and not intended to be restrictive of the type of materials or construction used with the present invention, but are typical of an air/metal cell.

In accordance with the present invention, a perforated plastic barrier 7 separates the chamber between the cathode 6 and the bottom 3a of the cup into two air chambers 8 and 9. The perforated member 7 serves as a support for air permeable membrane 13 and includes a plurality of air flow passages 10, the size of which is not particularly material to the present invention. The perforated support member 7 includes a central aperture 11 surrounded by an imperforate portion 12.

An air permeable membrane 13 is disposed on the cathode side of perforated support member 7 so as to cover perforations 10 and control the flow of oxygen from chamber 9 to chamber 8. The air permeable membrane is selected in a manner well known to those skilled in the art to provide the proper flow of oxygen from chamber 9 to the oxygen-consuming cathode 6 involved in the reaction of the cell, so as to control the limiting current which may be drawn from the cell at its rated voltage. Typical materials for the air permeable membrane 13 are microporous materials such as high density polyethylene or unsintered polytetraflouroethylene. The precise type of air permeable membrane is immaterial to the present invention and is selected to give the limited current drain desired for the application. In the case of a wristwatch, this would be on the order of 7 microamperes.

Figure 1B:
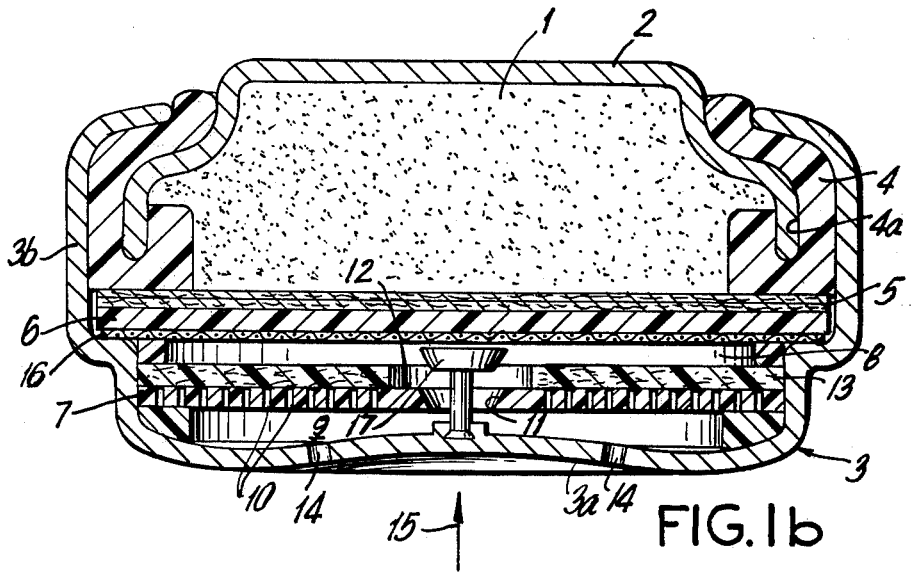
FIG. 1b is the same view showing the valve open.

In accordance with the present invention, the bottom 3a of the cathode cup includes metering ports 14 which admit ambient air to the chamber 9. The bottom 3a is constructed to bulge slightly outward so that external force as indicated by arrow 15 will cause the bottom of the cup to move inwardly, in an "oilcan" effect, and become displaced as shown in FIG. 1b.

Attached to the bottom 3a of the cup is a valve member 17. When the bottom of the cup 3a is in its normal position, valve member 17 closes off the central aperture 11. However, when external pressure is applied, the valve member opens admitting a greater flow of air from chamber 9 to chamber 8, as shown in FIG. 1b. When this occurs, the rate of flow of ambient air to the cathode is controlled by the area of ports 14 rather than by the air permeable membrane 18. Ports 14 are selected so that the limiting current flow at rated voltage is proper for the high current drain device which the cell is intended to operate.

The operation of the cell should be apparent. In normal operation, rate of admission of air (oxygen) to the cathode 6 is controlled by the membrane 13 and is proper for the low current use. For intermittent high current drain, an external force 15 opens the valve 17 and the higher rate of flow of air (oxygen) is controlled by ports 14.

Figure 2:
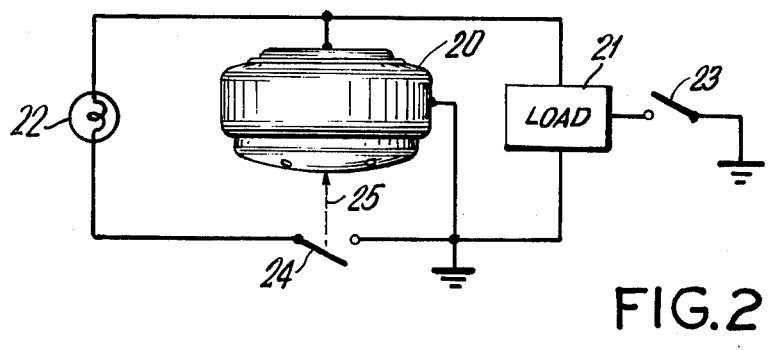
FIG. 2 is a circuit diagram.

Referring now to FIG. 2 of the drawing, a typical circuit application of the improved zinc/air cell is illustrated in a digital wristwatch. The application of external force is associated with the closing of a circuit by switching means which connect the cell with a high current drain device, such as the incandescent backlight for the display in a solid state electronic wristwatch.

FIG. 2 shows a simplified electrical circuit wherein a cell 20 is connected in parallel circuit configuration with a watch timekeeping and display load 21 and an incandescent backlight 22. The watch timekeeping and display circuit 21 is a low current device which may include a CMOS integrated circuit connected to cell 20 at all times. Setting switches 23 may be manually actuated to accomplish such functions as setting the time, date, etc. The incandescent bulb 22 is a high current device and is selectively connectable through switching means 24 to the cell. Switching means 24 are also arranged to physically press against the cell when the switch is closed as indicated by the dashed arrow 25. Thus actuation of switching means 24 simultaneously connects the high current device 22 and places cell 20 in a high current drain mode by enabling additional flow of oxygen to the cathode.

Figure 3:
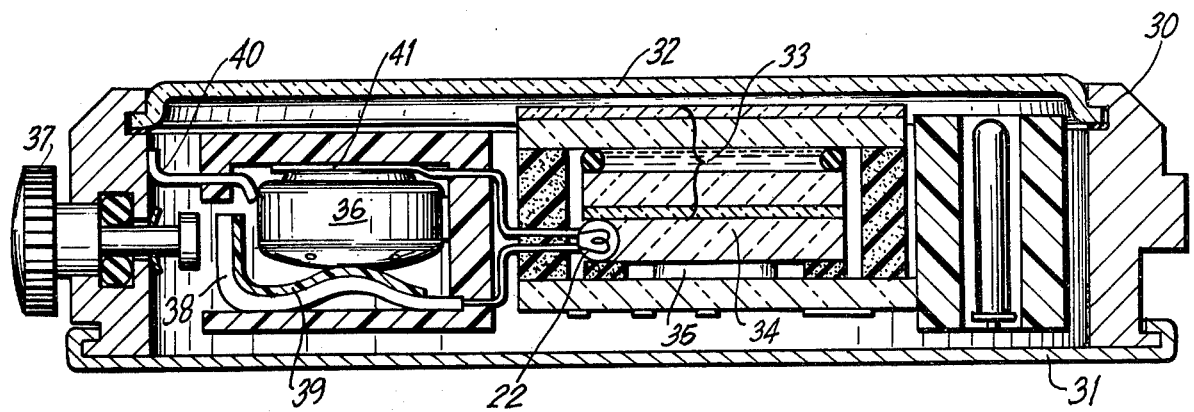
FIG. 3 is a simplified cross-sectional elevation view of a battery-operated wristwatch illustrating a preferred application of the invention.
Figure 4:
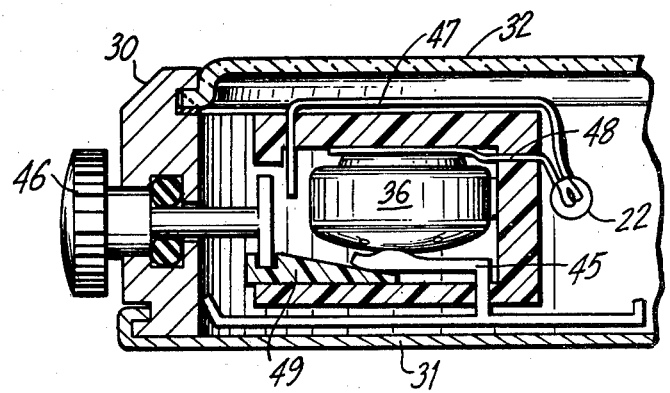
FIG. 4 is a partial cross-sectional elevation view of an alternate type of wristwatch construction.

FIGS. 3 and 4 are cross sections of solid state electronic wristwatches embodying the invention. In FIG. 3, a conductive watch case 30, caseback 31 and transparent crystal 32 enclose a watch module which includes a liquid crystal display 33, a backlight transparent diffuser member 34, integrated circuit 35 and incandescent backlight 22. The integrated circuit 35 is connected in circuit with the improved zinc/air cell 36 by suitable leads (not shown). A pushbutton member 37, which is electrically connected to the case 30, is arranged to push against an arcuate spring member 38, which is insulated from the battery by a strip of insulation 39. Electrical conducting strips 40, 41, serve to complete the circuit. When the pushbutton 37 is actuated, it closes the electrical circuit to the incandescent bulb 22, and also causes the arcuate spring member 38 to physically compress the air cell 36, thus opening the internal valve and placing it in high current mode to supply the high current consuming device 22. The backlight illuminates the display 33 by means of the diffuser member 34.

FIG. 4 shows an alternate arrangement of the pushbutton. In this case, the cell 36 is directly contacted by a flexible conductor 45 which is also grounded to the case. A grounded pushbutton 46 connects the electrical circuit through conductors 47, 48 when actuated. Pushbutton also operates an insulated wedge member 49 to cause the flexible conductor 45 to press against the cell 36 in a manner which will be obvious from the drawing.

Thus there has been described an improved zinc/air cell for intermittent high current demand, which is intended primarily for parallel operation of a low current consuming device, such as a typical solid state wristwatch.

While there has been disclosed herein what is considered to be the preferred embodiment of the invention, other modifications may occur to those skilled in the art, and it is intended to cover in the appended claims all such modifications as fall within the true spirit and scope of the invention.

I claim:

1. In an air/metal cell of the type having a catalytic air-consuming cathode disposed in a container and providing a current flow capacity determined by the rate of flow of air to said cathode, the improvement comprising;

a chamber connected to admit ambient air to said cell container, a barrier restricting flow of air from said chamber to the cathode for a preselected low current drain on the cell, and valve means inside the cell arranged to be actuated by an external force on the cell to bypass said barrier and provide flow of air to the cathode for a preselected high current drain on the cell.

2. The combination according to claim 1, wherein said cell is a button cell having a cathode cup defining a portion of said chamber and wherein said valve means is disposed in said chamber.

3. The combination according to claim 2, wherein said valve means is adapted to be actuated by force against said cathode cup.

4. The combination according to claim 1, wherein said barier is a gas permeable membrane supported on a perforated member dividing said container chamber into two smaller chambers.

5. The combination according to claim 1, wherein said container includes a bulged out portion operatively connected to said valve means and adapted to flex and open said valve with an "oilcan" effect when external force is applied.

6. The combination according to claim 1 including electrical switching means operatively connected to open said valve means when the switching means is actuated.

7. The combination according to claim 6, wherein said container includes a bulged out portion connected to the valve means and where said switching means presses against the said bulged out portion to open said valve means with an "oilcan" effect.

8. The combination according to claim 1, including an electric watch with low current drain powered by said cell, said watch having a pushbutton adapted to close a circuit to operate a high current load device in said watch also powered by said cell, said pushbutton adapted to exert a force on said cell container.

9. In an air/metal button cell of the type having a catalytic air-consuming cathode disposed in a container including a cathode cup and providing current flow determined by the rate of flow of air to said cathode, the improvement comprising:

a chamber defined in said cathode cup, said cup having ports admitting air to the chamber, a barrier restricting flow of air to the cathode for a preselected low current drain on the cell, said barrier including a perforated member supporting said gas permeable membrane, and valve means having a valve member in said cathode cup and adapted to admit air through said barrier providing flow of air to the cathode for a preselected high current drain on the cell, said valve being connected to said cup for activation by external force on the cup.

10. In an air/metal cell of the type having a catalytic air-consuming cathode disposed in a container and providing a current flow capacity determined by the rate of flow of air to said cathode, the improvement comprising;

a chamber connected to admit ambient air to said cell container, a barrier restricting flow of air from said chamber to the cathode for a preselected low current drain on the cell, said barrier comprising a gas permeable membrane supported on a perforated member dividing said container chamber into two smaller chambers, and valve means comprising a valve member disposed in an opening defined in said perforated member and connected to a portion of the cell container and arranged to be actuated by an external force on the cell to bypass said barrier and provide flow of air to the cathode for a preselected high current drain on the cell.

* * * * *